United States Patent
Wharton et al.

[19]

[11] Patent Number: 6,059,574
[45] Date of Patent: May 9, 2000

[54] AIRCRAFT FUEL TRAINER WITH LOW VISCOSITY/HIGH FLASHPOINT FUEL LOOK-ALIKE

[75] Inventors: Charles J. Wharton, Darien; Jeffrey E. Hunt, Middlebury, both of Conn.

[73] Assignee: The United States of America as represented by the Secretary of the Navy, Washington, D.C.

[21] Appl. No.: 09/095,816

[22] Filed: Jun. 11, 1998

[51] Int. Cl.[7] .................. G09B 9/02; G09B 9/08; G09B 9/00
[52] U.S. Cl. .................. 434/29; 434/30; 434/33; 434/35; 434/49; 434/54; 434/126
[58] Field of Search .................. 434/29, 30, 33, 434/35, 49, 54, 126; 244/135 R

[56] References Cited

U.S. PATENT DOCUMENTS 5,152,688  10/1992  Cellini .

OTHER PUBLICATIONS

Federal–Mogul, National O–Ring Design Guide; chart page, Fluid Compatibity (Hydrocarbon v. Water), where the Nomenclature is Fluorocarbon. No date avail.

*Primary Examiner*—Robert A. Hafer
*Assistant Examiner*—John Edmund Rovnak
*Attorney, Agent, or Firm*—John D. Lewis; Michael J. Gonet; Mark O. Glut

[57] ABSTRACT

A trainer for teaching the operation of aircraft fuel systems comprised of a fuselage frame portion and fuel tanks mounted to a platform. The trainer utilizes a fuel look-alike with a viscosity below 2.8 cs and a flashpoint above 200° F.

12 Claims, 1 Drawing Sheet

AIRCRAFT FUEL TRAINER WITH LOW VISCOSITY/HIGH FLASHPOINT FUEL LOOK-ALIKE

BACKGROUND OF THE INVENTION

The present invention relates generally to an aircraft fuel training apparatus. More specifically, it relates to a fuel trainer which uses a fuel look-alike with a high flash point and low viscosity.

Aircraft training devices school pilots and maintenance personnel in the operation, maintenance and service of aircraft and their systems without the expense, inconvenience and danger of training on actual aircraft. These training devices are often mockups or demonstrative apparatus of either full or scale size which isolate a particular system and simulate its function. Aircraft fuel systems are among the simulated systems. A typical aircraft fuel trainer includes fuel tanks and associated fuel lines and pumps to connect and transfer fuel between them. Visual indicators, switches and other hardware are also included. Actual components are used to best simulate the operation of the fuel system.

One prior method was to use actual aircraft fuel, such as JP4/5, in the simulation. Although this provided an accurate simulation, it was disadvantageous due to the fire hazard associated with the low flash point of the fuel. JP4 and JP5 have flash points of 135° F. and 150° F. respectively, making them "hazardous" materials under the Department of Transportation definition, which includes liquids with flash points below 200° F.

To avoid the fire hazard associated with actual aircraft fuel, fuel "look-alikes" with higher flash points have been used instead. For example, U.S. Pat. No. 5,152,688 to Cellini discloses the use of SEMTOL 85 {™}, available from Witco Chemical Corporation; and PENRECO {™} white mineral oil #2260, available from Pennzoil Products Company. These liquids have flash points of 365° F. and 260° F. respectively.

Although the use of look-alikes such as SEMTOL-85 {™} and PENRECO {™} has improved safety, the disadvantage has been an inaccurate simulation due to their viscosity. An accurate simulation requires a fluid with a viscosity, specific gravity and dielectric constant similar to that of aircraft fuel. SEMTOL 85 {™} has a specific gravity of 0.803 and a dielectric constant of approximately 25–30 KV/cm2. Thus for these two properties it is similar to JP4, which has a specific gravity of 0.76 and a dielectric constant of 25–30 KV/cm2; and JP5, which has a specific gravity of 0.81 and a dielectric constant of 25–30 KV/cm2. However, its viscosity of 16 cs (at 104° F.) is many times greater than 0.9 cs and 1.4 cs for JP4 and JP5 respectively (at 100° F.). This also holds true for PENRECO, which has a viscosity of 4.3 cs.

This high viscosity results in a greater fluid pressure drop across the system components and thus an inaccurate simulation. To have both an accurate simulation and safety would require a fluid with a low viscosity and a high flash point. Insofar as flash point generally increases with viscosity, a look-alike with all of the desired characteristics has heretofore not been used.

BRIEF SUMMARY OF THE INVENTION

It is an object of the invention to provide a fuel trainer which is safer and provides a more accurate simulation than previous designs. The present invention uses a fuel look-alike with a non-hazardous flash point, and the low viscosity, specific gravity, dielectric constant of aircraft fuel.

The aircraft fuel trainer includes two fuel tanks and a fuselage frame mounted to a platform in their normal positions on an aircraft. A control panel provides control over the system and an instructors panel allows the instructor to inject problems into the system.

DETAILED DESCRIPTION OF THE PREFERRED EMBODIMENTS

Figure 1:
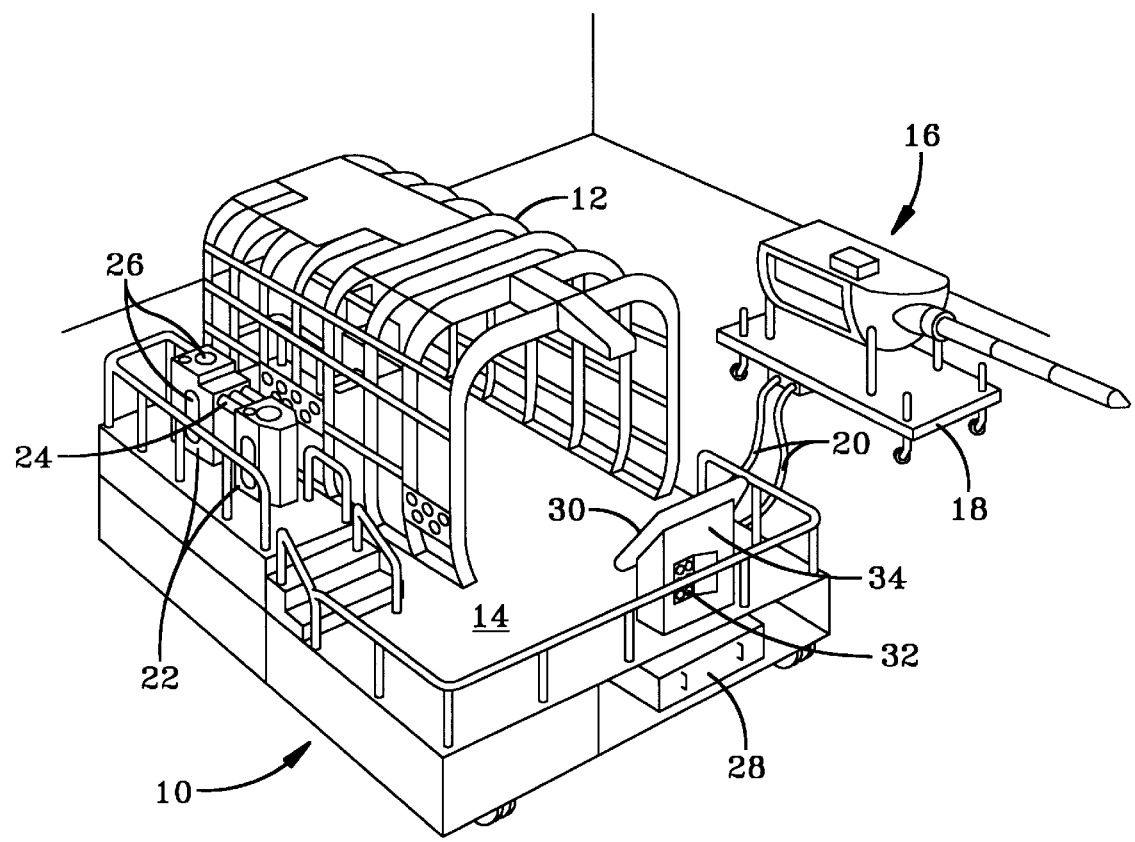
FIG. 1 is a perspective drawing of the fuel trainer.

Turning to FIG.1, which illustrates a fuel training apparatus for use with helicopters, the fuel system trainer 1 is comprised of a main trainer unit 10 and a refuel probe unit 16. The refuel probe unit 16 is mounted to wheeled cradle 18 and connected to the main unit 10 by electrical and pneumatic lines 20. The main trainer unit 10 is comprised of a portion of helicopter fuselage frame 12 mounted to platform 14. Insofar as fuselage skin would interfere with training procedures, it is not applied. Two fuel tanks or cells 22 are also mounted to the platform 14. The tanks 22 include windows 26 for observing fuel levels and fuel components, such as pumps and level sensing probes, within. The heights of the tanks are identical to the heights in an actual helicopter, so that aircraft gaging system tank units may be used. However, horizontal lengths are reduced to make operation more convenient by reducing the volume. The tanks are connected to each other with fuel lines 24 and to the fuel storage tank 28 (fuel lines not shown).

The trainer includes the pumps, valves and other mechanisms and subsystems found on aircraft fuel systems, as understood by those skilled in the art. All components are located with respect to each other as in an actual aircraft. In particular, this is true of the location of the fuel tanks relative to the fuselage. Although the trainer only includes components on the right hand side of the fuel system, the left hand side is represented whenever possible and convenient.

The fuel system is operational and performs like an actual aircraft fuel system. It enables the student to learn the basic fueling and defueling of the tanks, the operation of the refuel probe, and how to transfer fuel between tanks. Furthermore, it permits instruction in purging the fuel system by compressed air, dumping fuel from the tanks, and operation of the fuel quantity/low level warning system.

Pressurized fuel is supplied from storage tank 28 to the tanks 22 and possibly to refuel probe unit 16. Tanks may be filled and drained individually or simultaneously. Control panel 30 is mounted on support 34 and simulates the aircraft instrument panel and includes lights, visual indicators, switches and other hardware as found on an actual aircraft. Control panel 30 is located to permit use and observation by multiple students. An instructor's panel 32 is located on the face of support 34, opposite the control panel. Here the instructor may inject faults and problems into the fuel system to teach the student to handle various operational situations.

Instead of using a high viscosity fuel look-alike such as SEMTOL-85, the present invention uses a fuel look-alike which has a viscosity more similar to that of aircraft fuel. To provide an accurate simulation, the fuel look-alike should have a viscosity below 2.8 cs (at 100° F.). To further provide an accurate simulation, the look-alike should have a specific gravity between 0.76 and 0.81 (at 60° F./60° F.), and a dielectric constant of 25–30 KV/cm2. To ensure safety, this fluid should have a flash point above 200° F.

A problem with finding a fluid with all of these properties is that the viscosity of a fluid generally increases with its flash point. If viscosity is too high, the fluid pressure drop across the system components will be too high, resulting in an inaccurate simulation. Thus most fluids with flash points in the desired range cannot be used. However, there are exceptions to the general relationship between flash point and viscosity. An example of a liquid with all four properties in the desired range is PD-23 mineral oil, produced by Witco Chemical Corporation. PD-23 is a liquid combination of saturated aliphatic and alicyclic hydrocarbons with a viscosity of 2.6 cs (at 100° F.), a flash point of 230° F., a specific gravity (60° F./60° F.) of 0.8, and a dielectric constant of 25–30 KV/cm2. Although this product is intended for use in petroleum distillate applications such as lotions, creams, household cleaners, polishes, and liquid candles, it would nevertheless be a useful fuel look-alike in the above described fuel trainer.

An advantage of the present invention over prior designs is that it more closely simulates the behavior of actual aircraft fuel. The fuel look-alike has a viscosity which is closer to that of aircraft fuel and therefore the pressure drops and fuel transfer rates more closely resemble those of the actual aircraft system. Another advantage is safety. Insofar as the look-alike has a flash point above 200° F., it is not considered hazardous by the Department of Transportation. Thus the present invention combines the safety of prior look-alikes with the simulation accuracy of actual aircraft fuel.

The invention has been described with reference to a helicopter embodiment. It is obvious that the abovementioned fuel look-alike can be used in trainers for fixed wing and any other type of fuel burning aircraft. Other modifications and alterations will occur to others upon the reading and understanding of this specification. It is intended to include all such alterations and modifications insofar as they come within the scope of the appended claims or the equivalents thereof.

What is claimed is:

1. An aircraft fuel trainer comprising a fuel look alike, a fuel system, the fuel system comprised of a fuel storage means for containing the fuel look-alike, a first fuel tank connected to the fuel storage means, and a control means including hardware means for controlling the fuel system, wherein the fuel look alike has a viscosity below 2.8 centistokes and has a flash point above 200° F.

2. An aircraft fuel trainer as in claim 1 wherein the fuel system is further comprised of instructor panel means for injecting faults and problems into the fuel system.

3. An aircraft fuel trainer as in claim 2 further comprising platform means which mount the first fuel tank, the control means and the instructor panel means.

4. An aircraft fuel trainer as in claim 3 further comprising a fuselage frame mounted to the platform means.

5. An aircraft fuel trainer as in claim 4 wherein the fuel system further comprises a second fuel tank, mounted to the platform means and connected to the first fuel tank.

6. An aircraft fuel trainer as in claim 5 wherein the fuselage frame is full scale.

7. An aircraft fuel trainer as in claim 6 wherein the first and second fuel tanks are of full scale height.

8. An aircraft fuel trainer as in claim 7 wherein the first and second fuel tanks are mounted to the platform means adjacent to the fueselage frame in their normal position on an aircraft.

9. An aircraft fuel trainer as in claim 8 further comprising a refuel probe means electrically and pneumatically connected to the fuel trainer.

10. A method for training a student in the operation of an aircraft fuel system comprising the steps of providing a fuel look-alike, passing the fuel look-alike through the fuel system comprised of a first fuel tank connected to a second fuel tank, a controlling means for controlling the movement of the fuel look-alike, and an instructing means for injecting problems into the passage of the fuel look-alike, wherein the step of providing the fuel look-alike further comprises the step of providing the fuel look-alike with a viscosity below 2.8 centistokes and the step of providing the fuel look-alike with a flashpoint above 200° F.

11. The method of claim 10 further comprising the step of mounting the first fuel tank, the second fuel tank, the controlling means, the instructing means and a fuselage frame to a mounting means.

12. The method of claim 11 wherein the step of mounting further comprises the step of mounting the first and second fuel tanks adjacent to the fuselage frame in their normal position on an aircraft.

\* \* \* \* \*